F. A. SWAN.

AUTOMATIC FIRE ALARM.

APPLICATION FILED AUG. 25, 1920.

Reissued Aug. 22, 1922. 15,436.

INVENTOR.

Frederick A. Swan by Jas. H. Churchill

Atty.

UNITED STATES PATENT OFFICE.

FREDERICK A. SWAN, OF CLIFTONDALE, MASSACHUSETTS.

AUTOMATIC FIRE ALARM.

15,436. Specification of Reissued Letters Patent. Reissued Aug. 22, 1922.

Original No. 1,326,304, dated December 30, 1919, Serial No. 178,121, filed July 2, 1917. Application for reissue filed August 25, 1920. Serial No. 405,969.

*To all whom it may concern:*

Be it known that I, FREDERICK A. SWAN, a citizen of the United States, residing at Cliftondale, in the county of Essex and State of Massachusetts, have invented an Improvement in Automatic Fire Alarms, of which the following description, in connection with the accompanying drawing, is a specification, like characters on the drawing representing like parts.

This invention relates to automatic fire alarms and particularly to the detector mechanism by which the fire alarm signal will be automatically sent in when fire conditions arise.

One object of the invention is to provide a differentiating detector device which will differentiate between a rise of temperature due to fire conditions and a rise of temperature due to other causes, and which will become operative to sound the alarm whenever fire conditions arise, but which will be inoperative for this purpose when an excessive temperature arises in the locality where the device is located, provided such excessive temperature is not the result of fire conditions.

Another object of the invention is to provide a fire alarm system which will differentiate between a false alarm and a true alarm, and also to provide a fire alarm apparatus which will give indication when the circuit of the detector device is open or broken, and otherwise to improve fire alarm apparatus, all as will be more fully hereinafter set forth.

I accomplish these various objects by employing as my detector a device in the nature of a differentiating thermo-electric battery which is connected to a relay that operates two circuits and is constructed to cause the relay to close one circuit when fire conditions arise and to close the other circuit when it is subjected to a rise of temperature due to an abnormal cause, such, for instance, as an attempt to send in a false alarm. As is well known to those skilled in the art, a thermo-electric battery has the capability of generating a current in one direction when the temperature of one set of the junctions thereof is raised relative to that of the other junctions and of developing a current in the other direction when the temperature of the first-named junctions is lowered relative to that of the other junctions. If, however, all the junctions are of the same temperature no current is generated. The thermo-electric battery in my invention is so sustained relative to the wall or ceiling of the room in which it is placed that it will be uninfluenced by the temperature of the wall or ceiling and will be influenced only by the temperature of the atmosphere. The terminals of one set are situated so that they are freely influenced by a rapid change of temperature due to fire conditions, while the terminals of the other set are arranged so that they are affected only slightly by such rapid change of temperature. The construction is such, however, that the terminals of the latter set will be affected to a greater extent by a rise of temperature due to such abnormal conditions as the application of heat directly to the detector device such as would be caused by applying a lighted match thereto. Hence with this arrangement a current in one direction will be generated by the detector device when it is subjected to a rise of temperature due to fire conditions while a current in the other direction will be generated when it is subjected to a rise of temperature due to some abnormal condition. The circuit of the detector is connected to a relay arranged to close either one of two circuits, depending upon the direction of the current generated by the detector. Each circuit will have a suitable signal therein so that by observing the operation of the signal, it can be determined whether the detector is being subjected to a rise of temperature due to fire conditions or to a rise of temperature due to some other cause. The device is thus a differentiating detector.

In order to give an understanding of my invention, I have illustrated in the drawings a selected embodiment thereof which will now be described, after which the novel features will be pointed out in the appended claims.

Figure 1:
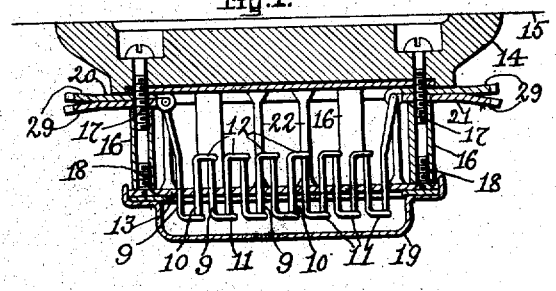
Figure 1 is a vertical section through the thermo-electric element of my apparatus.

The circuit by or through which the alarm is sounded is indicated at 1, said circuit including a return wire 25. I have not shown herein the details of a fire alarm box, as this may be of any suitable construction adapted to be rendered operative to send in the alarm when the circuit 1 is closed, but I have illustrated diagrammatically at 41 a city fire alarm box to which the circuit 1, 25 is connected, and it will be understood that when said circuit 1, 25 is closed, the box 41 will be actuated to send an alarm to headquarters over the usual signal circuit 42. A fire alarm box adapted for such use is illustrated in my Patent No. 1,194,571, August 15, 1916. The circuit 1 is shown as having two normally-open contacts 2 and 3 therein which are closed by the operation of the thermo-electric element of my device when fire conditions arise.

The contact 2 is shown as a stationary contact and the contact 3 as a movable contact, said contact 3 being herein illustrated as the needle or pointer of a relay 4. This relay comprises a coil 5 suspended for rotation between the poles 6 of a magnet 7. This pointer 3 is electrically connected to the return wire 25 of the circuit 1. When there is no current in the coil 5, then said coil and its pointer 3 will assume a neutral position. If the current flows through said coil in one direction, then the coil will be turned about its axis to swing the pointer 3 toward the contact 2, while if current flows from the coil in the opposite direction, said coil will be turned oppositely to swing its pointer away from the contact 2.

The coil 5 of the relay is connected in a circuit 8 which leads to the thermo-electric element of my apparatus. This thermo-electric element is in the nature of a thermo-electric battery composed of a plurality of thermo-electric couples, each of which comprises two members 9 and 10 of different metals which are connected at the junctions 11 and 12. These electric couples are arranged in series as usual in a thermo-electric battery, and are sustained in a plate 13 of insulating material, the members 9 and 10 of each couple extending transversely through the plate so that the junctions 12 are situated above the plate, while the junctions 11 are situated below the plate. This supporting plate 13 with the thermo-electric couples secured thereto is sustained by a base-piece 14, preferably of insulating material, which is adapted to be screwed to a ceiling 15 or to a wall or any other suitable support. The plate 13 is so secured to the base 14 that the junctions 12 are spaced from said plate and ceiling and are exposed freely to the atmosphere. While any suitable way of supporting the plate 13 from the base 14 might be employed, I have herein shown the plate as secured to a plurality of posts 16 which in turn are secured to the base 14. These posts are shown as hollow and they are secured to the base by means of screws 17 which extend through the base and screw into one end of the hollow posts. The plate 13 is secured to the posts by other screws 18 which extend through the plate and screw into the lower end of the posts. With this construction the upper junctions 12 of the thermo-electric battery are situated between the plate 13 and the base 14, and are spaced from both the base and the wall 15. Moreover, they are freely exposed to the atmosphere and are subject to the full effect of any atmospheric temperature changes.

Means are provided for protecting the lower junctions 11 that are situated below the plate 13 from the full effect of rapid temperature changes. This may be done in various ways, and as one simple construction, I have shown a cap or cover 19 which is secured to the plate 13 and incloses the junctions 11. The protecting cap or cover 19 may be made of metal, rubber, fiber or any suitable material.

The opposite ends of the battery are connected to two terminals 20 and 21 to which are connected the two sides of the circuit 8 having the operating relay 7 therein.

The operation of the device as thus far described is as follows:—

So long as the atmospheric temperature in the locality of the thermo-electric element remains substantially constant or is subjected to slow variation, the two sets of junctions 11 and 12 will have substantially the same temperature, and consequently no current will be generated in the circuit 8. As a result, the coil 5 will remain in its central position and the contact 3 will be separated from the contact 2.

If, however, there should be a rapid rise in atmospheric temperature, such, for instance, as would result in the case of a fire, the exposed junctions 12 will immediately feel the effect of such change of temperature, and the temperature of said junctions will rise accordingly. Since the other junctions 11 are protected by the protecting cover 19, they will be influenced only gradually by the sudden rise in temperature. In other words, the effect of the rapid rise in temperature on the junctions 11 is retarded. Consequently, the exposed junctions 12 will soon acquire a temperature greater than the protected junctions 11, and this difference in temperature will generate a current in the circuit 8. The current thus generated flows through the coil 5 in a direction to cause said coil to turn into a position to close the contact 3 against the contact 2, thus closing the circuit 1, 25, with the result that the box 41 will operate to send the alarm. The protection afforded by the cover 19 is intended to be simply sufficient to protect the junctions 11 against the influence of a rapid rise in temperature, such as would be caused by fire conditions, but not to protect said junctions against the influence of a slow or gradual rise in temperature. If, therefore, the temperature in the locality of the thermo-electric element rises gradually or slowly, the relative temperature of the two sets of junctions 11 and 12 will remain approximately the same, and as a result there will not be current generated sufficient to operate the relay 7. The device, therefore, is the one which will differentiate between a rise of temperature due to fire conditions and a rise of temperature due to other conditions.

The thermo-electric element is provided with bars 22 which are situated between the posts 16 and which form with the posts a sort of grid to prevent any foreign substance from entering between the plate 13 and the base 14.

It sometimes happens that mischievous or malicious persons will attempt to send in a false fire alarm by applying a match or some other artificial heat to the thermostatic element of an automatic fire alarm system. My apparatus is so constructed that if any person does maliciously apply a match to the thermo-electric element with the intention to send in a false alarm, the relay will operate to indicate the fact that the device has been tampered with, but will not send in the alarm. A person attempting thus to send in a false alarm would naturally apply the match or other heating means to the bottom of the thermo-electric element, that is, to the protecting plate 19. If this is done, the heat will be transmitted through said plate to the junctions 11 and the temperature of the junctions 11 will thus be raised over that of the junctions 12. This will cause a current to flow in the circuit 8 in a direction opposite to that in which it flows when the junctions 12 are at a higher temperature than the junctions 11, and such current will cause the coil 5 to turn in a direction to move the contact 3 away from the contact 2. I have provided herein an additional contact 23 situated on the opposite side of the contact 3 from the contact 2 so that when the indicator contact 3 swings to the right, Fig. 2, it will engage the contact 23. This contact 23 is in a circuit 24 leading to any suitable signal apparatus other than the fire alarm apparatus and herein represented as an electrically operated bell 43 which will preferably be situated at headquarters. The circuit 24 may be connected to the return 25. If, therefore, a person attempts to send in a false alarm by applying heat to the underside of the thermo-electric element, the result will be the closing of the circuit 24 and the indication at headquarters of the fact that an attempt had been made to send in a false alarm. My thermo-electric element is, therefore, so constructed that it will be affected in one way by a sudden rise of temperature in the space surrounding said element, such, for instance, as would be due to fire conditions, and will be affected in another way by a sudden rise in temperature locally applied to said element, such, for instance, as would result from the application of a lighted match thereto. The junctions 12 are influenced freely by sudden rise in temperature in the space surrounding the thermo-electric element, but since they are situated between the plate 13 and the base 14 they are protected from the full effect of a local rapid rise in temperature, such as would result from applying a lighted match to the device. The junctions 11, on the other hand, are protected from the rapid rise in temperature in the space surrounding the element, but are not protected from the local rapid rise in temperature.

I have also provided herein means whereby a suitable indication will be made if the circuit 8 becomes open by the breaking of a wire or otherwise. This is herein accomplished by placing across said circuit 8 a shunt circuit 26 having therein a relatively high resistance 27 and also a relatively small source of electricity, such, for instance, as a single dry cell 28. The resistance of the circuit 8 is relatively low and the high resistance 27 will prevent any of the current generated by the thermo-electric device from flowing through the shunt circuit 26, so that the presence of the shunt circuit does not interfere with the operation of the device. Moreover, owing to the high resistance 27 the amount of current which is impressed on the circuit 26 by the dry cell 28 will be exceedingly small, and so long as the circuit is closed, the greater part of such exceedingly small current will flow through the thermo-electric element rather than through the coil 5 owing to the greater resistance of the coil. The device is so adjusted that the amount of current from the battery 28 which is thus normally impressed on the coil 5 is insufficient to affect the relay so long as the circuit 8 is closed. The cell 28 is so connected in the circuit that the current generated thereby tends to oppose the current generated by the thermo-electric element when the junctions 12 are at a higher temperature than the junctions 11 and tends to flow through the coil 5 in a direction to cause the contact 3 to swing toward the contact 23. If the circuit 8 should become broken between the shunt circuit 26 and the thermo-electric element, then all the current generated by the battery 28 will be impressed on the coil 5 and this is sufficient to actuate said coil to close the circuit 24, thereby ringing the bell 43 and giving indication at headquarters that the thermo-electric element needs attention.

My device, therefore, operates not only to differentiate between fire conditions and a rise in temperature due to other causes, but also indicates at headquarters when the thermo-electric element is out of order or has been tampered with.

Figure 2:
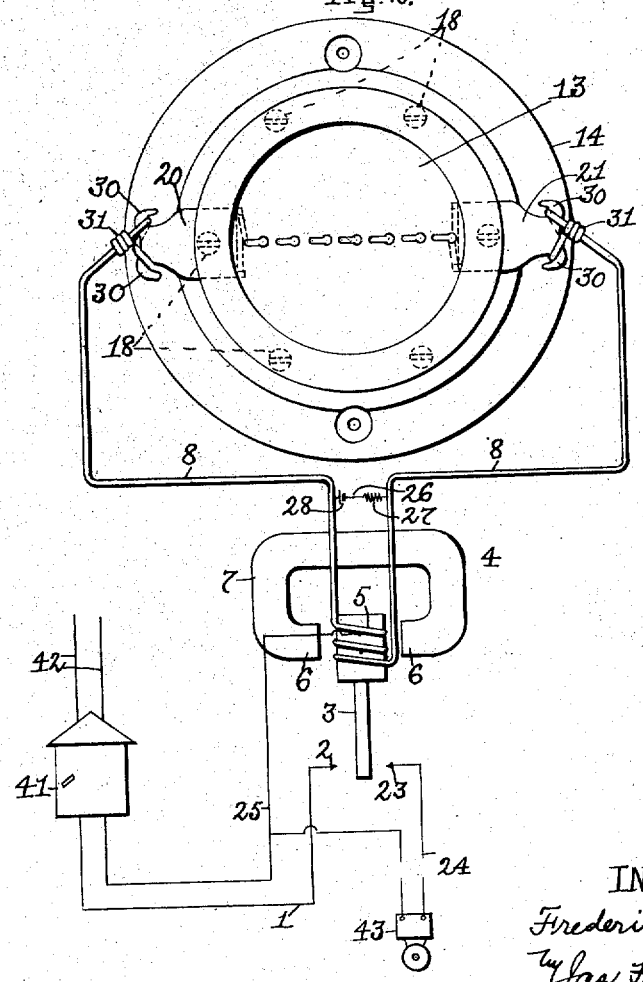
Fig. 2 is a bottom plan view of the thermo-electric element with the protecting cover 19 removed, said view also showing the relay and wiring connections.

In actual practice the relay 7 will be made very sensitive so that it will respond to an exceedingly small current. Fig. 2 of the drawings is intended to illustrate a relay diagrammatically without any intention of suggesting or indicating its actual structure.

I have herein shown a terminal connection between the terminals 20 and 21 and the circuit 8 by which a good electric connection is always insured. Each of the terminals 20 and 21 is formed of two spring plates 29, each of which is provided with a T-shaped head. The ends of the wires 8 are wound about the arms 30 of the head and the end of the wire is then wrapped about the body thereof, as shown at 31. By this means the two heads are drawn together slightly and the resiliency of them will tend to hold the wire taut and thus insure a good electrical connection.

Claims:

1. In a fire alarm, the combination with a differentiating thermo-electric battery comprising a plurality of connected thermo-electric couples and means by which the junctions of one set are freely exposed to rapid temperature changes in the space surrounding the thermo-electric element but are protected against local rapid temperature changes and the junctions of the other set are protected against rapid temperature changes in the space surrounding the thermo-electric element but are influenced freely by a rapid local temperature change whereby current will be generated in one direction when the device is subjected to a rise of temperature due to fire conditions and will be generated in the other direction when subjected to a localized rise of temperature, of two indicating circuits, and means to close one circuit when the current generated by said thermo-electric element flows in one direction and the other circuit when said current flows in the other direction.

2. In a detector device for fire alarm apparatus, the combination with a base member adapted to be secured to a wall or ceiling, of a supporting plate sustained thereby, but separated therefrom, a plurality of connected thermo-electric couples sustained by said supporting plate, the junctions which are situated between the plate and the base being exposed to the influence of rapid temperature changes, and means protecting the set of junctions on the outside of said supporting plate from the influence of rapid temperature changes.

3. In a detector device for fire alarm apparatus, the combination with a base member adapted to be secured to a wall or ceiling, of a supporting plate sustained thereby, but separated therefrom, a plurality of connected thermo-electric couples sustained by said supporting plate, the junctions which are situated between the plate and the base being exposed to the influence of rapid temperature changes, and a protecting cover inclosing the junctions on the outer side of the supporting plate.

4. A thermo-electric element for fire alarm systems comprising a plurality of connected thermo-electric couples having two sets of junctions, means for protecting the junctions of one set against a local rapid rise of temperature while permitting said junctions to be freely influenced by a rapid rise of temperature in the space surrounding said element and for protecting the other set of junctions from said latter sudden rise in temperature while permitting the first-named set of junctions to be influenced freely by the local rapid rise of temperature.

5. In a fire alarm apparatus, the combination with a differentiating thermo-electric battery comprising a plurality of connected thermo-electric couples, means to protect the junctions of one set from rapid temperature changes in the space surrounding the battery while permitting said junctions to be freely affected by a rapid rise in temperature localized closely adjacent to said battery, and to protect the junctions of the other set from such localized rapid rise of temperature without affecting the influence thereon of the rapid rise in temperature in the space surrounding the battery, of two circuits, means to close one circuit when current is developed in one direction in said battery and the other circuit when current is developed in the other direction in said battery, a city fire alarm box connected to one of said circuits and adapted to be actuated by the closing thereof to send an alarm to headquarters, and a signal connected to and actuated by the closing of the other circuit.

6. In a fire alarm apparatus, the combination with a differentiating thermo-electric battery comprising a plurality of connected thermo-electric couples and means by which said battery will develop current in one direction when it is subjected to a rise of temperature due to fire conditions, and in the other direction when subjected to a rapid rise of temperature localized closely adjacent said battery, two indicating circuits, means to close one circuit when the battery develops current in one direction and the other circuit when it develops current in the other direction, a city fire alarm box connected to one circuit to be actuated by the closing thereof to send an alarm to headquarters, and a signal device in the other circuit.

7. In a fire alarm system, the combination with a thermo-electric battery, of a sensitive relay in circuit with said battery, and a permanently closed electric battery shunt connected across the terminals of the relay and of relatively higher resistance than said circuit, for the purpose specified.

FREDERICK A. SWAN.